United States Patent
Kalenahalli et al.

(10) Patent No.: US 12,452,797 B2
(45) Date of Patent: Oct. 21, 2025

(54) SYSTEMS AND METHODS FOR ACCURATELY AND EFFICIENTLY DETERMINING INTERFERENCE IN A GEOGRAPHIC AREA

(71) Applicant: Outdoor Wireless Networks LLC, Claremont, NC (US)

(72) Inventors: Suryanarayana A. Kalenahalli, Chantilly, VA (US); Ariful Hannan, Sterling, VA (US); Khalid W. Al-Mufti, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 416 days.

(21) Appl. No.: 18/149,598

(22) Filed: Jan. 3, 2023

(65) Prior Publication Data

US 2023/0254779 A1     Aug. 10, 2023

Related U.S. Application Data

(60) Provisional application No. 63/308,823, filed on Feb. 10, 2022.

(51) Int. Cl.
*H04W 52/24*     (2009.01)
*H04W 24/08*     (2009.01)
*H04W 52/36*     (2009.01)

(52) U.S. Cl.
CPC ......... *H04W 52/243* (2013.01); *H04W 24/08* (2013.01); *H04W 52/367* (2013.01)

(58) Field of Classification Search
CPC . H04W 52/243; H04W 52/367; H04W 24/08; H04W 52/24; H04W 52/241; H04W 52/242; H04W 52/283
See application file for complete search history.

(56) References Cited

U.S. PATENT DOCUMENTS

| | | | |
|---|---|---|---|
| 11,082,930 B2 * | 8/2021 | Kalenahalli | H04B 17/373 |
| 2022/0158346 A1 * | 5/2022 | Marr, Jr. | H01Q 3/38 |
| 2022/0272701 A1 * | 8/2022 | Hannan | H04W 16/14 |

OTHER PUBLICATIONS

Drocella et. al., "3.5 GHz Exclusion Zone Analyses and Methodology", National Telecommunication and Information Administration (NTIA) Report 15-517, Reissued Mar. 2016, pp. Cover through 85.

Okumura et al., "Field Strength and Its Variability in VHF and UHF Land-Mobile Radio Service", Review of the Electrical Communication Laboratory, vol. 16, Nos. 9-10, Sep.-Oct. 1968, pp. 825 through 873.

Wireless Innovation Forum, "Requirements for Commercial Operation in the U.S. 3550-3700MHz Citizens Broadband Radio Service Band", Document WINNF-TS-0112, Version V1.9.1, Mar. 11, 2020, pp. Cover through 76.

* cited by examiner

*Primary Examiner* — John J Lee

(74) *Attorney, Agent, or Firm* — Fogg & Powers LLC

(57) ABSTRACT

Techniques are provided for enhancing accuracy of modelling aggregate interference at each protection point of a geographical area in a region having an urban or suburban morphology type whilst reducing processing requirements by diminishing a number of elevation data that must be obtained from external sources. The geographical area may be a priority access license protection area, a grandfathered wireless protection zone, or other geographic area which must be protected from interference.

24 Claims, 9 Drawing Sheets

SYSTEMS AND METHODS FOR ACCURATELY AND EFFICIENTLY DETERMINING INTERFERENCE IN A GEOGRAPHIC AREA

CROSS-REFERENCE TO RELATED APPLICATIONS

The present application claims benefit of U.S. patent application Ser. No. 63/308,823 filed Feb. 10, 2022; the entire contents of the aforementioned patent application are incorporated herein by reference as if set forth in its entirety.

BACKGROUND

A citizens broadband radio service (CBRS) includes incumbent users of shared spectrum and secondary users of shared spectrum. An incumbent user may also be referred to as a primary user or an incumbent. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s), geographic region(s) to be maintained interference free, and/or other secondary user(s) above corresponding interference threshold levels for each of such incumbent user(s), geographic region(s), and secondary user(s).

Such secondary users use citizens broadband radio service device(s) (CBSD(s)). A CBSD is a radio including a transmitter coupled to an antenna. A CBRS system may include at least one spectrum access system (SAS). Each SAS regulates the transmissions of certain CBSD(s) in the shared spectrum under the SAS's control, e.g., whether each CBSD of a SAS can transmit in the shared spectrum, and if so, then at what frequency spectrum and power level, to ensure that aggregate interference at incumbent user(s), geographic region(s), and/or other CBSDs is within appropriate limits.

Each CBSD may be a Priority Access License (PAL) CBSD or a General Authorized Access (GAA) CBSD. SAS(s) may seek to regulate interference at GAA CBSD(s). SAS(s), however, must regulate interference from GAA CBSD(s) not only at each PAL CBSD but also a region around one or more PAL CBSD.

The region around one or more PAL CBSDs is referred to as a PAL protection area (PPA).[1] For CBRS, the PPA is defined by a −80 dBm/10 MHz contour around each PAL CBSD which the PPA protects. A PPA may be formed by a union of such contours for nearby PAL CBSDs. Aggregate interference, at each protection point of a PPA, from other CBSD(s)[2] in a neighborhood of a corresponding protection point must be less than −80 dBm/10 MHz. The neighborhood of a protection point means a geographic region centered around the protection point. Optionally, the neighborhood is a circle having a radius of 40 km.

[1] Analogous to a PPA, interference must also be regulated within an area known as a grandfathered wireless protection zone (GWPZ). A GWPZ is a geographic area and frequency range in which grandfathered wireless licensees receive protection from CBSD transmission.

[2] I.e., GAA CBSD(s) and/or PAL CBSD(s) outside of the PPA.

To facilitate analysis, each PPA is modelled by, and thus comprises, at least one protection point, e.g., uniformly spaced apart from one another. A protection point is a point where aggregate interference must not exceed a threshold level. Interference analysis is performed at each protection point. A PPA with more than one protection point is common. When a number of protection points in a PPA grows, a number of CBSD-protection point pairs at which interference analysis must be performed grows exponentially. Thus, computational processing requirements and time required to perform such analysis exponentially increases. If computational resources are outsourced, e.g., to a cloud computing service, cost increases can be significant.

One way that computational processing requirements and time required to perform such analysis increases shall be described. The SAS determines whether to allow the requesting CBSD to transmit in the frequency spectra, and allocates using, e.g., an iterative allocation process (IAP), transmit power levels to all CBSDs authorized by the SAS controller to transmit in the frequency spectra.

The IAP is a process that helps achieve this goal by setting an upper bound of transmit power of CBSDs when each individual CBSD is allocated an equal portion of an interference threshold of a protection point of a PPA. Because the PPA may have numerous protection points, determination of such upper bounds of transmit power for each CBSD can be time consuming given the sheer volume of CBSD-protection point pairs that need to be processed.

WInnForum SAS general requirement (requirement) R2-SGN-16 of WINNF-TS-0112 defines the IAP. WINNF-TS-0112 is incorporated by reference herein in its entirety. The IAP regulates interference by setting an upper bound of transmit power for each CBSD in the neighborhood of a protection point of a PPA by allocating each CBSD an equal portion of an interference threshold, e.g., at the protection point of the PPA. The IAP determines such transmit power levels by allocating interference margin equally to CBSDs in neighborhood(s) of protection point(s), e.g., of PPAs.

A PPA with more than one protection point exponentially increases analysis time. For a PPA, determination of such upper bounds of transmit power for each CBSD can be time consuming given a sheer volume of CBSD protection point pairs that need to be processed. Such pairs comprise each protection point of the PPA and CBSD(s) within a neighborhood of a corresponding protection point of the PPA.

Further, R2-SGN-04 of WINNF-TS0112 specifies that more than one propagation loss model need be used when determining path loss for PPAs and GWPZs for IAP calculation. For example, if the distance between a CBSD and a protection point is greater than or equal to 1 km and less than or equal to 80 km, the IAP must calculate path loss using both the irregular terrain model ("ITM") and the extended Hate ("eHata") model. The ITM and the eHata model are propagation models and may alternatively referred to as such herein. Compared to the ITM, the eHata propagation model provides more accurate modelling over short distances, e.g., 2 km or less particularly in urban and suburban environments. ITM provides more accurate modelling over longer distances particularly in rural environments. The ITM and eHata propagation models are processing intensive as each requires obtaining elevation data for a geographic location of each point along a propagation path which is analyzed by such models; obtaining such elevation data significantly consumes more processing capacity.

Processing can be made more efficient by diminishing a number of terrain elevations which must be obtained, e.g., from external databases such as at the U.S. Geological Survey (USGS). U.S. Pat. No. 11,082,930 (hereinafter "the '930 Patent"), incorporated in its entirety herein by reference, describes one technique for diminishing the number of terrain elevations which must be obtained when determining maximum transmission powers of CBSD(s) near a PPA, e.g., in a region having an urban or suburban topology. The '930 Patent does so by only obtaining terrain elevations for a set of CBSD in a neighborhood of a protection point of a PPA (having a geographic morphology type that is urban or suburban) whose interference at the protection point exceeds an interference threshold. Path loss between each CBSD and protection point is then computed using such terrain elevations. Each computed path loss may be used to determine an interference contribution of a corresponding CBSD at the protection point. Terrain elevation extraction is not performed for each of other CBSD(s) in the neighborhood of the protection point. A path loss for each of the other CBSD(s) in the neighborhood of the protection point is computed without terrain elevation. Thus, interference contribution at the protection point by each of the other CBSD(s) is determined without using terrain elevation.

Although the invention of the '930 Patent diminishes processing requirements by reducing a number of terrain elevation extractions, interference by CBSD(s) within a neighborhood of a protection point, and thus the aggregate interference at the protection point, may not be accurately modelled.

SUMMARY OF THE INVENTION

A method to determine radio maximum transmit power level is provided. The method comprises: determining each of a first set, a second set, and a third set; wherein the first set means at zero or more subsets of at least one radio, wherein each subset of at least one radio is uniquely associated with a corresponding protection point of a geographic region which must be protected from interference from radios, and wherein each radio of a subset of at least one radio is geographically located in a neighborhood of the corresponding protection point of the geographic region and is estimated to cause interference at the corresponding protection point of the geographic region that exceeds an interference threshold level; wherein the neighborhood means a geographic region around the corresponding protection point of the geographic region; wherein the second set means a set of zero or more radios each of which is in a neighborhood of at least one protection point of the geographic region and has an effective height correction that exceeds a height correction threshold level; wherein the effective height correction of a radio means (a) terrain elevation at radio geographic location plus (b) a radio antenna height less (c) average terrain elevation along a first area of a radio sector which is formed by a first radius and a second radius emanating from a geographic location of a radio and encompasses all or a portion of the corresponding protection point, of the geographic region, in whose neighborhood the geographic location of the radio resides; wherein the third set means a set of zero or more radios each of which is in the neighborhood of at least one protection point of the geographic region, wherein there is an unobstructed line of sight between such radio and the geographic region; and for each ith protection point of the geographic region, determining a maximum transmission power level for each radio of a set $Cd_i$, wherein set $Cd_i$ means a set of radios in a neighborhood of an ith protection point of the geographic region.

A non-transitory computer readable medium storing a program causing at least one processor to execute a process to determine radio maximum transmit power level is provided. The process comprises: determining a union of sets $Cd_i$ for each protection point of the geographic region; identifying each radio that is an element of the union in each sector of the geographic region (geographic region sector), wherein geographic region sector means a first region bounded by two radii emanating from a centroid of the geographic region; for each geographic region sector in which at least one radio was identified, determining an eHata penetration radius r that is a function of a number of radios in a corresponding geographic region sector; for each geographic region sector in which at least one radio was identified, generating a circular area, with a corresponding eHata penetration radius r, is generated around a corresponding centroid of the identified radios in a corresponding geographic sector; and identifying each protection point geographically located within each generated circular area.

A system configured to determine radio maximum transmit power level is provided. The system comprising processing circuitry configured to: determine each of a first set, a second set, and a third set; wherein the first set means at zero or more subsets of at least one radio, wherein each subset of at least one radio is uniquely associated with a corresponding protection point of a geographic region which must be protected from interference from radios, and wherein each radio of a subset of at least one radio is geographically located in a neighborhood of the corresponding protection point of the geographic region and is estimated to cause interference at the corresponding protection point of the geographic region that exceeds an interference threshold level; wherein the neighborhood means a geographic region around the corresponding protection point of the geographic region; wherein the second set means a set of zero or more radios each of which is in a neighborhood of at least one protection point of the geographic region and has an effective height correction that exceeds a height correction threshold level; wherein the effective height correction of a radio means (a) terrain elevation at radio geographic location plus (b) a radio antenna height less (c) average terrain elevation along a first area of a radio sector which is formed by a first radius and a second radius emanating from a geographic location of the radio and encompasses all or a portion of the corresponding protection point, of the geographic region, in whose neighborhood the geographic location of the radio resides; wherein the third set means a set of zero or more radios each of which is in the neighborhood of at least one protection point of the geographic region, wherein there is an unobstructed line of sight between such radio and the geographic region; and for each ith protection point of the geographic region, determine a maximum transmission power level for each radio of a set $Cd_i$, wherein set $Cd_i$ means a set of radios in a neighborhood of an ith protection point of the geographic region.

BRIEF DESCRIPTION OF THE DRAWINGS

Comprehension of embodiments of the invention is facilitated by reading the following detailed description in conjunction with the annexed drawings, in which.

DETAILED DESCRIPTION

Figure 1:
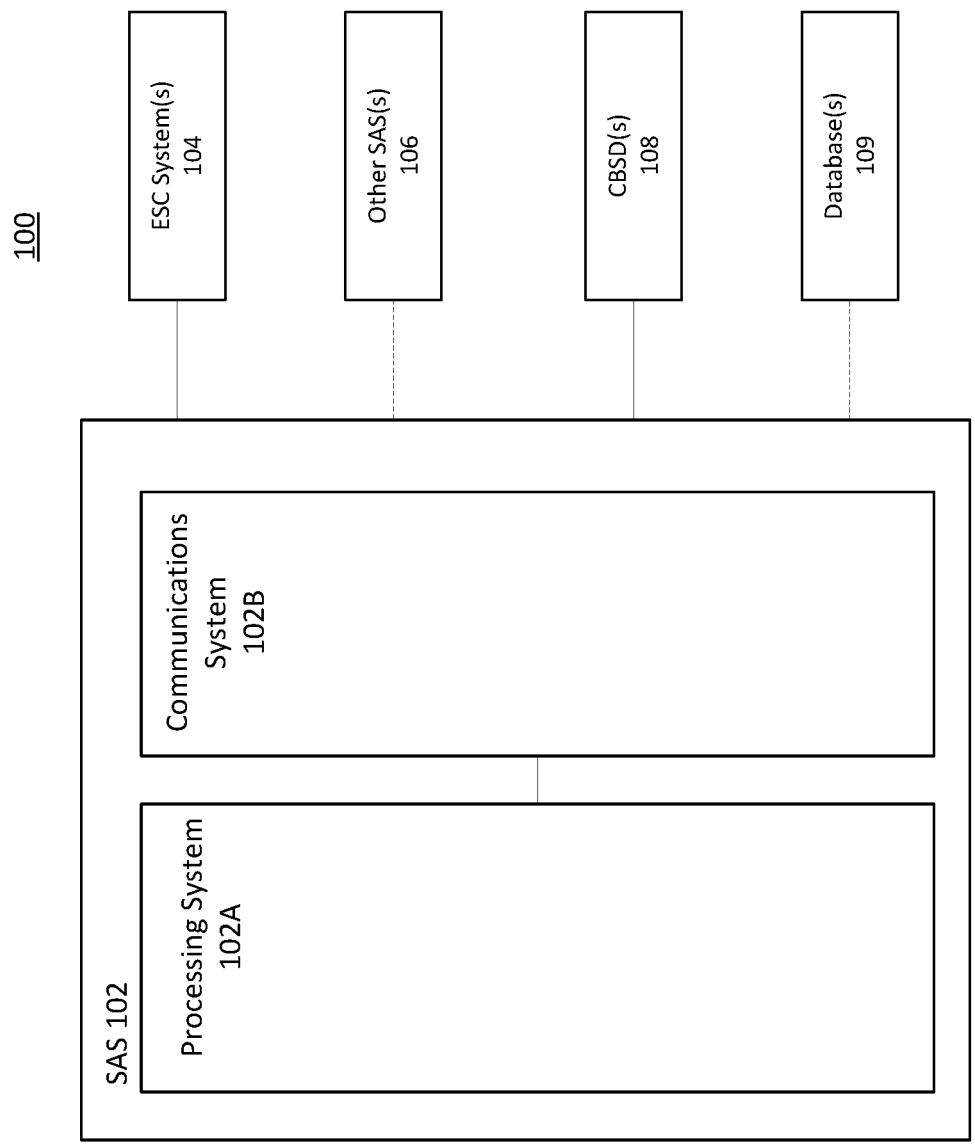
FIG. 1 illustrates a block diagram of one embodiment of a shared spectrum system configured to diminish terrain elevation extraction at locations of each radio in a neighborhood of a protection point of a PPA and to enhance accuracy of estimates of aggregate interference at each protection point of a PPA.

Embodiments of the invention implement techniques for enhancing accuracy of modelling aggregate interference at each protection point of a geographical area in a region having an urban or suburban morphology type whilst reducing processing requirements by diminishing a number of elevation data that must be obtained from external sources. The geographical area may be a PPA, a grandfathered wireless protection zone, or other geographic area which must be protected from interference, e.g., by GAA CBSD(s). For pedagogical purposes, the invention shall hereafter be described with respect to a PPA even though it is applicable to such other geographical areas.

Embodiments of the invention do so by determining additional set(s) of CBSD(s) whose terrain elevations must be obtained and used to determine path loss between each such CBSD and a protection point of a PPA (whose geographic morphology type is urban or suburban) whose neighborhood encompasses a geographic location of such CBSD. The additional set(s) pertain to the effective height correction and isolated ridge correction aspects of the eHata model. The former identifies CBSD(s) having an estimated height correction greater than or equal to a height threshold. The latter adjusts the eHata model so that it more accurately models electromagnetic propagation in a geographic region having terrain that is irregular, e.g., not flat. For example, the geographic region may have a terrain morphology type of urban or suburban. For PPAs located in geographic regions which have an urban or suburban morphology type, path loss between most pairs of a PPA protection point and a CBSD in a neighborhood of the PPA protection point may be modelled using a median propagation path loss determined with the eHata propagation model and do not require terrain elevation. For example, more than eighty or ninety percent of CBSD and PPA protection point pairs do not require terrain elevation. Thus, in comparison to the invention of the '930 Patent, accuracy of modelled interference by CBSD(s) within a neighborhood of a protection point, and thus the modelled aggregate interference at the protection point, is increased without significantly increasing computational resources needed to perform such modelling.

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Shared spectrum (or shared frequency spectrum) means frequency spectrum utilized by: (a) incumbent user(s) (e.g., a receiver of a fixed satellite service (FSS)) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user.

A protection point means a point representing actual and/or potential incumbent user(s) and/or geographic region(s) which are to remain free of interference (as that term is defined herein) from CBSDs.

Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum protected from interference, e.g., utilized by a receiver of an incumbent user or a PAL CBSD.

Frequency spectrum means a bandwidth centered about a center frequency. Unless otherwise indicated herein, power as used herein means power or power spectral density. Power levels for a shared spectrum system, such as a CBRS, are often characterized in terms of power spectral density levels. Optionally, power or power spectral density may be a level radiated by antenna(s) electrically coupled to a transmitter of a CBSD and characterized in terms of effective isotropic radiated power (EIRP).

A CBRS system comprises general authorized access (GAA) and/or priority access license (PAL) CBSDs, and incumbent users and geographic region(s) to be maintained free of interference. The incumbent users, such as government users fixed satellite service receiver(s), have priority access, with respect to secondary users such as CBSDs, to some or all of spectrum in the shared spectrum. When satisfying interference requirements, a SAS is configured to grant the CBSDs access to the shared spectrum, including authorizing frequency spectrum (or channels) requested by CBSDs, and authorizing a corresponding requested maximum transmission power or assigning a lower than requested maximum transmission power. Maximum transmit power (or maximum transmit power level) means a maximum power level that a CBSD can transmit while ensuring that an aggregate interference level, e.g., each at protection point(s) or optionally another CBSD, remains at or below a permissible interference threshold level; such maximum transmit power may be authorized by a SAS or a system that performs interference protection analysis like the SAS. The SAS is configured to control the transmission of GAA CBSDs so that PAL CBSDs and the incumbent users are free of interference from GAA CBSDs. The GAA and PAL CBSDs are secondary users; the PAL CBSDs are secondary users because they have a lower priority than incumbent users. For example, PAL and GAA CBSDs have to also protect Environmental Sensing Capability (ESC) sensors which are used to detect radar transmissions, e.g., from naval ships, in the CBRS band. The SAS is also configured to control the transmission of PAL and GAA CBSDs so that incumbent users are free of interference from PAL and GAA CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold interference) is determined. The acceptable level of interference may vary by the type of incumbent user or geographic region, frequency spectrum, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Incumbent users of shared spectrum have first, or highest, priority to utilize the shared spectrum controlled by the SAS. Thus, incumbent users (e.g., the receivers of incumbent users' communications systems such as radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL CBSDs have second (or intermediate) priority, after incumbent users (excluding PAL users), to utilize the frequency spectrum controlled by the SAS. In another embodiment, a PAL user shall be able to operate, when incumbent users (excluding PAL CBSDs) are free of interference of such a PAL user, and free of interference from other PAL CBSDs and general authorized access users. In one embodiment, an ability of a PAL CBSD to operate free of interference shall be limited temporally, geographically, and spectrally within the specifications of its license.

GAA CBSDs have third, or lowest, priority to utilize the frequency spectrum controlled by the SAS. In one embodiment, an operation of GAA CBSDs will be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit when incumbent user(s) and geographic region(s) to be maintained interference free are free of interference when the GAA CBSD transmits.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

FIG. 1 illustrates a block diagram of one embodiment of a shared spectrum system 100 configured to diminish terrain elevation extraction at locations of each radio in a neighborhood of a protection point of a PPA and to enhance accuracy of estimates of aggregate interference at each protection point of a PPA. Thus, the shared spectrum system 100 comprises a SAS 102 configured to more efficiently and more accurately determine maximum transmit power allocated to CBSD(s) within a neighborhood of each protection point of the PPA. Each CBSD may be operated by a general authorized access user and/or a priority access licensee.

Optionally, the SAS 102 is coupled to at least one environmental sensing capability system (ESC system(s)) 104. Optionally, the SAS 102 is coupled to at least one database (database(s)) 109, e.g., which has information about (a) incumbent user(s) and/or (b) geographic region(s) to be maintained interference free (e.g., type, interference threshold power level, location, information about neighborhood, and/or when certain incumbent user(s) and/or geographic regions(s) to be maintained interference free are scheduled to receive in the shared spectrum or to include a communications system, e.g., a radar, that will receive in the shared spectrum. One or more of the database(s) 109 may comprise terrain elevation for geographic region(s), e.g., in which CBSD(s) are located; one or more of the database(s) 109 may comprise morphology type data (e.g., rural, water, urban, and suburban) for such geographic region(s).

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users.

The SAS 102 is configured to perform interference analysis and authorize transmission by CBSD(s) 108 in the shared spectrum. The SAS 102 is configured to determine a maximum transmission power level for a set of the CBSD(s) 108 which it has authorized to transmit in the shared spectrum.

CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. The CBSD(s) 108 of the shared spectrum system 100 may generate electromagnetic energy that overlaps the geographic region(s) comprising CBSD(s) whose transmissions are controlled by the other SAS(s) 106, and thus must be accounted for by the other SAS(s) 106 when the other SAS(s) 106 perform interference analysis, and authorize operation of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographic region(s).

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the database(s) 109 which may be coupled to the SAS 102.

The SAS 102 also is also configured to control the operation (e.g., power levels and frequencies of operation) of the GAA user(s)' CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

Figure 2A:
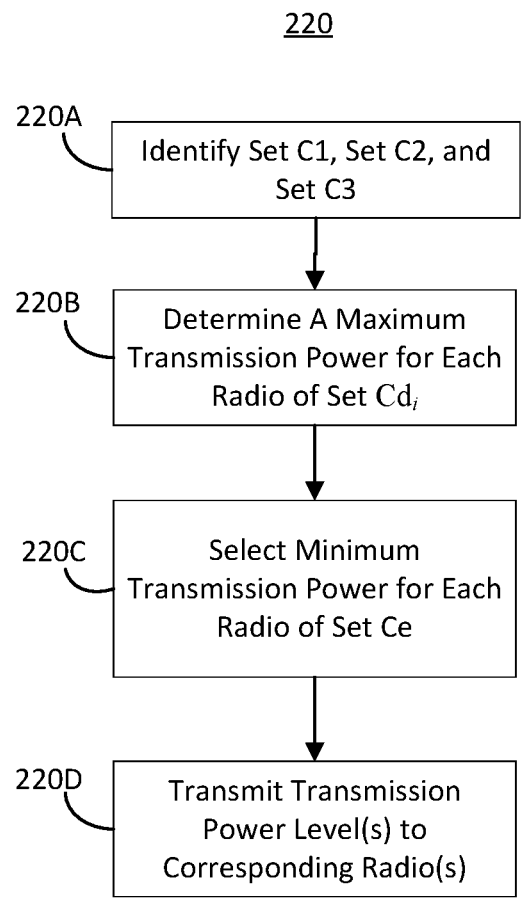
FIG. 2A illustrates a flow diagram of one embodiment of a method to diminish terrain elevation extraction and to enhance accuracy of estimates of aggregate interference at each protection point, of a PPA in a geographic region having an urban or a suburban morphology type.

FIG. 2A illustrates a flow diagram of one embodiment of a method 220 to diminish terrain elevation extraction and to enhance accuracy of estimates of aggregate interference at each protection point, of a PPA in a geographic region having an urban or a suburban morphology type. To the extent that the methods shown in any Figures are described herein as being implemented with any of the systems illustrated herein, it is to be understood that other embodiments can be implemented in other ways. Optionally, method 220 may be implemented by a SAS 102, e.g., by the processing system 102A, or by any other type of processing system, e.g., which may be used to model or analyze actual or potential deployment of radios configured to transmit in shared frequency spectrum and have their transmissions controlled by a SAS; method 220 is illustrated for pedagogical purpose as being implemented by a SAS 102. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220A, set C1, set C2, and set C3 are each determined or identified. The set C1 (or a first set) may comprise a set of radio(s) for one or more protection points of a PPA, where each radio is within a first band of distances from a corresponding protection point of the PPA; as a result, the eHata model can accurately model propagation of interference (in regions of irregular terrain such as regions having a morphology type that is urban or suburban) into the PPA by such radio(s) when the PPA is in a geographic region having an urban or suburban morphology. Moreover, the set C1 means zero or more subsets of at least one radio, wherein each subset of radio(s) is uniquely associated with a corresponding protection point of a PPA, and wherein each radio of a subset of radio(s) is geographically located in a neighborhood of the corresponding protection point of the PPA and is estimated to cause interference at the corresponding protection point of the PPA that exceeds an interference threshold level, e.g., −80 dBm/10 MHz. For purposes of clarity, a radio may be an element of one or more subsets of the set C1.

The set C2 (or a second set) means a set of zero or more radios each of which is in a neighborhood of at least one protection point of the PPA, wherein each such radio has an effective height correction that exceeds a height correction threshold level; the height correction threshold is applicable for all protection points of the PPA. Effective height correction of a radio means (a) terrain elevation at radio geographic location plus (b) a radio antenna height less (c) average terrain elevation along a first area of a sector emanating from the radio and encompassing all or a portion of the corresponding protection points, of the PPA, in whose neighborhood a geographic location of the radio resides. Such average terrain elevation described in subset (c) may be referred to herein as average terrain elevation, and will be further described elsewhere herein. Effective height correction of a radio is used to account for terrain elevation between the radio and the PPA. Effective height correction pertains to an effective height correction factor used by the eHata model.

The set C3 (or a third set) means a set of zero or more radios, wherein each radio is in a neighborhood of at least one protection point of the PPA, and wherein there is an unobstructed line of sight between such radio and the PPA, e.g., because the radio and/or the PPA are at a higher altitude. An isolated ridge means a single obstruction in a propagation path that blocks a line of sight to a receiver location and is above an average elevation of points on the propagation path and at which propagation is modelled. Ridge correction pertains to a ridge correction factor used by the eHata model to compensate for reduced obstructions on terrain, between the radio and the PPA, and not accounted for by a median path loss resulting from the eHata model prior to any corrections being applied.

In block 220B, for each ith protection point of the PPA, a maximum transmit power for each radio of set $Cd_i$ is determined, e.g., using IAP performed by the SAS. Each PPA comprises M protection points, wherein M is an integer that is greater than zero. Set $Cd_i$ means radio(s) in a neighborhood of the ith protection point (PP). The maximum transmission power level of each radio of set $Cd_i$ is determined based upon obtaining terrain elevations for geographic locations of radios of set $Cd_i$ which are elements of a union of the set C1, the set C2, and the set C3 as is described elsewhere herein.

Thus, each set $Cd_i$ includes the determined maximum transmit power for each radio comprising such set. Because at least one radio may be geographically located within neighborhoods of two or more protection points of the PPA, the same radio may be assigned a different maximum transmit power depending upon which set $Cd_i$ is considered.

To resolve this discrepancy, when it occurs, in optional block 220C, a minimum of maximum transmit powers (or minimum maximum power level) of at least one radio of a set Ce is determined. Optionally, block 220C is performed for all radio(s) of set Ce or only for each radio which is an element of two or more sets $Cd_i$ and/or which have been assigned two different maximum transmit powers. Set Ce means a union of set(s) $Cd_i$ for each protection point of the PPA, e.g., for the first through the Mth protection point. Thus, each minimum of maximum transmit powers of a radio becomes the maximum transmit power of the radio. In optional block 220D, each determined minimum of maximum transmit powers is transmitted to a corresponding radio. Optionally, each radio to which a determined minimum of maximum transmit powers is sent (and at which is also received) is configured to transmit at the determined minimum of maximum transmit powers.

Figure 2B:
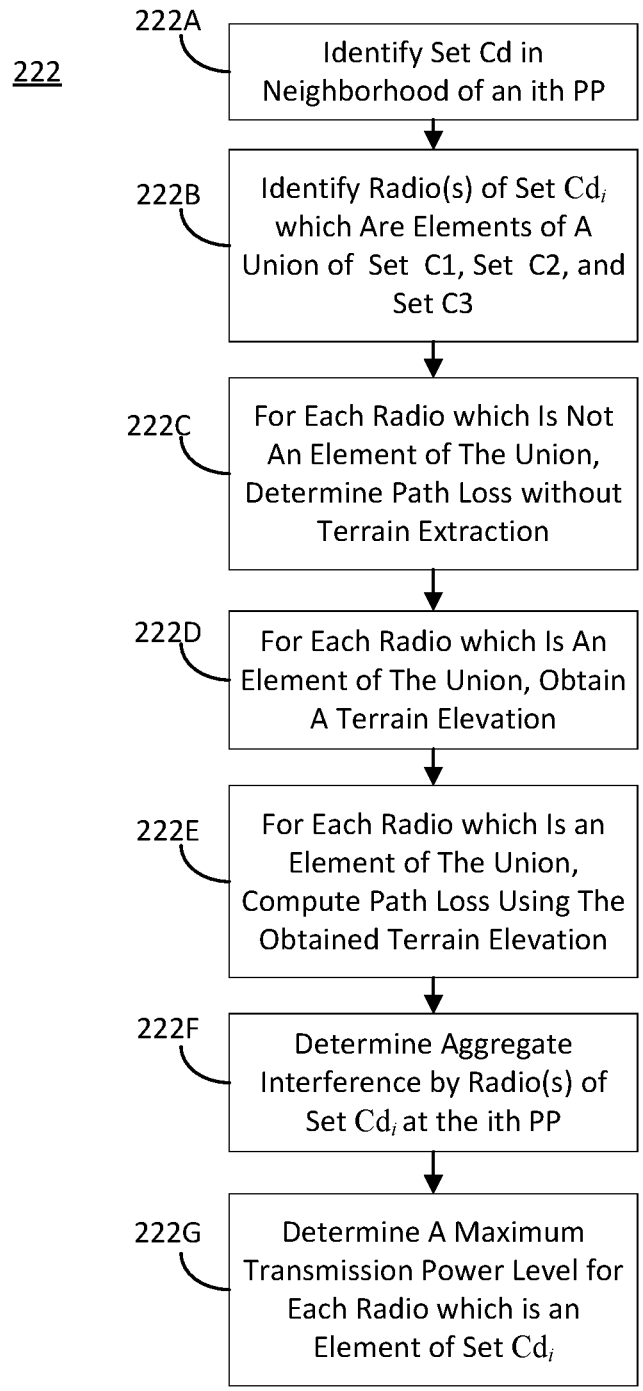
FIG. 2B illustrates a flow diagram of one embodiment of a method to determine, for an ith protection point of the PPA, a maximum transmit power for each radio of set $Cd_i$.

FIG. 2B illustrates a flow diagram of one embodiment of a method 222 to determine, for an ith protection point of the PPA, a maximum transmit power for each radio of set $Cd_i$, e.g., to affect in part block 220B. Optionally, method 222 is performed by a SAS.

In block 222A, a set $Cd_i$ is determined or identified, wherein set $Cd_i$ means radio(s) in a neighborhood of an ith protection point of the PPA. Identifying radios in the neighborhood entails determining which radio(s) are located within a geographic region of the neighborhood which is centered around the protection point.

In block 222B, radio(s) of the set $Cd_i$ (for the ith protection point) that are elements of a union of the set C1, the set C2, and the set C3 are identified. Thus, radio(s) of set $Cd_i$ (for the ith protection point) that are not elements of the union of the set C1, the set C2, and the set C3 are also identified.

In block 222C, for each radio which is an element of set $Cd_i$ (for the ith protection point) but is not an element of the union of the set C1, the set C2, and the set C3, a path loss (between the radio and the ith protection point) is determined without use of terrain elevation. The path loss is determined with a modified eHata model which does not require terrain elevation for points (at which propagation analysis is performed) along a propagation path between the radio and the ith protection point. One example of such a modified eHata model is subsequently illustrated (however, other modified eHata model(s) may be used):

Median Path Loss=97.62+3.19 log $f$+4.45(log $f$)$^2$−13.82 log $h_b$−3.2(log $h_m$)$^2$+4.97+(44.9−6.55 log $h_b$)log$_d$, where f is the frequency in MHz, $h_b$ is a transmitter antenna height in meters, $k_m$ is a receiver antenna height in meters, and d is the distance between transmitter and receiver in km.

In block 222D, for each radio which is an element of set $Cd_i$ (for the ith protection point) and is an element of the union of the set C1, the set C2, and the set C3, a terrain elevation of points (at which propagation analysis is performed) on the propagation path between the radio and the ith protection point are obtained. The points may each be separated by a fixed distance, e.g., 30 m or 1 arc second, or a non-constant distance. Optionally, such terrain elevation would have had to be obtained from an external source, e.g., one or more of the database(s) 109. Optionally, the external source may be provided by the U.S. Geological Survey or another institution.

In block 222E, for each radio which is an element of set $Cd_i$ (for the ith protection point) and is an element of the union of the set C1, the set C2, and the set C3, a path loss (between the radio and the ith protection point) is determined using the obtained terrain elevation. The path loss is determined by determining a maximum of (a) a path loss (between the radio and the ith protection point) determined using the eHata model and (b) a path loss (between the radio and the ith protection point) determined using the ITM.[3] Both the eHata model and the ITM require terrain elevation.

[3] Determination of path loss may vary based upon system or standard specifications. Techniques for determining path loss may vary based upon a distance between a radio and an ith protection point. For analysis of a PPA for CBRS, path loss is determined as follows. When such distance is less than or equal to 100 m, then path loss is equivalent to free space path loss. When such distance is between 100 m and 1 km, then path loss is an interpolation between free space path loss and median path loss determined with the eHata model. When such distance is greater than or equal to 1 km and less than or equal to 80 km, then path loss is a maximum of (a) a path loss (between the radio and the ith protection point) determined using the eHata model and (b) a path loss (between the radio and the ith protection point) determined using the ITM. When such distance is greater than 80 km, then the path loss is a function of the eHata model and ITM.

In block 222F, an aggregate interference at the ith protection point (of the PPA) due to each radio that is an element of set $Cd_i$ is determined using a corresponding determined path loss. In block 222G, a maximum transmit power for each radio of set $Cd_i$ is determined, e.g., using IAP.

Figure 3A:
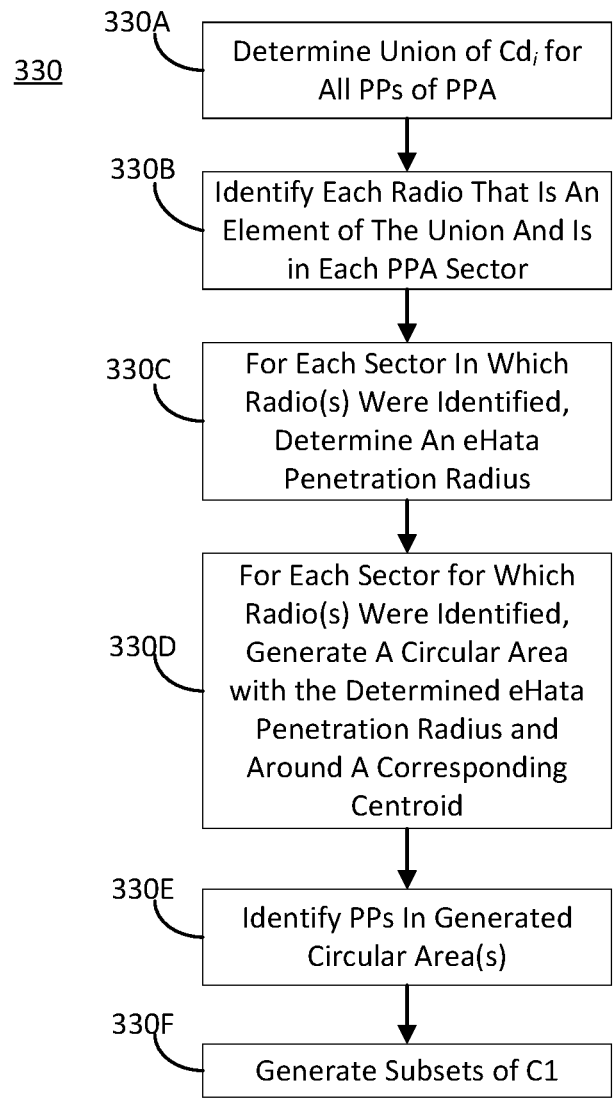
FIG. 3A illustrates a flow diagram of one embodiment of a method 330 to determine or identify a first set.

FIG. 3A illustrates a flow diagram of one embodiment of a method 330 to determine or identify the set C1, e.g., to affect in part block 220A. In block 330A, a union, of sets $Cd_i$, of all protection points of the PPA, is determined. In block 330B, identify each radio (which is an element of the union of sets $Cd_i$ (for each protection point of the PPA)) in each PPA sector emanating from a centroid of the PPA and is within a first band of distances from a protection point (closest to a corresponding radio) in a corresponding PPA sector. First band of distances means a range of distances (i.e., a first distance to a second distance) along an axis emanating from the protection point closest to the corresponding radio.

Figure 3B:
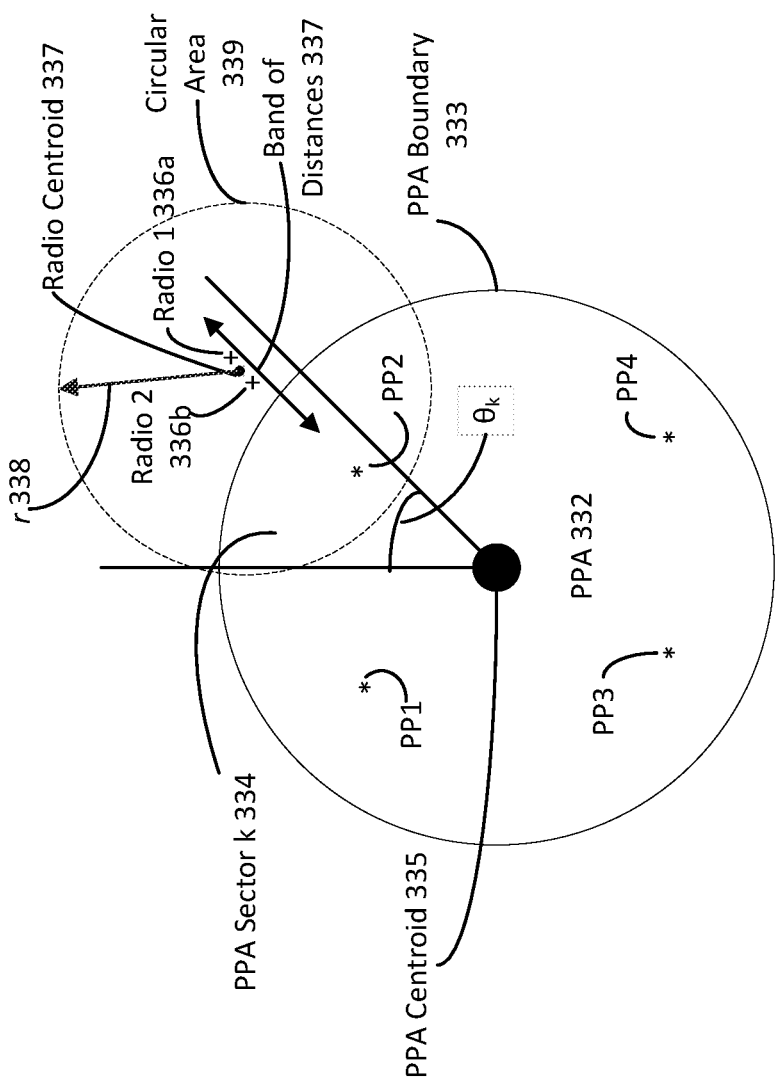
FIG. 3B illustrates a diagram of one embodiment of a PPA.

FIG. 3B illustrates a diagram of one embodiment of a PPA 332. The PPA 332 is defined by its PPA boundary (or PPA contour) 333. For pedagogical purposes, the PPA boundary 333 is illustrated as a circle; however, the PPA boundary 333 may have a shape which is different than, and may be more complex than, a circle.

The PPA 332 includes four protection points: a first protection point PP1, a second protection point PP2, a third protection point PP3, and a fourth protection point PP4. Only four protection points are illustrated for pedagogical reasons. A PPA could have many more protection points than illustrated in FIG. 3B.

The PPA 332 comprises J PPA sectors. PPA Sector means a first region bounded by two radii emanating from a centroid (or PPA centroid) 335 of the PPA 332. Each PPA sector has an arc measure (i.e., an angle) $\theta_k$; optionally, each arc measure $\theta_k$ may be equal. If each PPA sector has the same angle, then J equals 360 degrees/$\theta$, when $\theta$ is in degrees. Optionally, if $\theta$ equals one degree, then J equals 360.

A first radio 336a and a second radio 336b are within PPA sector k 334 and is with a band of ranges from a closest protection point, protection point 2 PP2. Optionally, the band of ranges may be zero to two kilometers or two to four kilometers.

Returning to FIG. 3A, in block 330C, for each PPA sector in which radio(s) were identified in block 330B, an eHata penetration radius r is determined. The eHata penetration radius r is based upon a number of radios in each PPA sector identified in block 330B. The eHata penetration radius r is a radius emanating from a centroid of the radio(s) identified in a corresponding PPA sector in block 330B. Optionally, in one embodiment:

$$r(\text{in km}) = \begin{cases} d_s & N_c = 1 \\ 2.5 & N_c = 2, \\ d_s * \log_2 N_c & N_c > 2 \end{cases}$$

where $d_s$ is an empirically derived, e.g., to be 2 kilometers, and $N_c$ is the number of radio(s) in a corresponding PPA sector and in the band of ranges from a closest protection point in the corresponding PPA sector. FIG. 3B illustrates an exemplary eHata penetration radius r 338 which emanates from the centroid (or radio centroid) 337 of the radio(s) in a corresponding PPA sector and identified in block 330B.

Returning to FIG. 3A, for each PPA sector in which radio(s) were identified in block 330B, in block 330D, a circular area, with a corresponding eHata penetration radius r, is generated around a corresponding centroid of the identified radios in a corresponding geographic sector. FIG. 3B illustrates an exemplary circular area 339 around a centroid 337.

Returning to FIG. 3A, in block 330E, protection point(s), geographically located within each circular area generated in block 330D, are identified. In FIG. 3B, the second protection point PP2 is within the circular area 339. Returning to FIG. 3A, in block 330F, subset(s) of the set C1 are generated, wherein each subset of the set C1 is for a unique protection point (identified in block 330E) and comprises elements that are the radio(s) (identified in block 330B) and which are used to determine radio centroid(s) used to form circular area(s) encompassing the unique protection point.

Figure 4A:
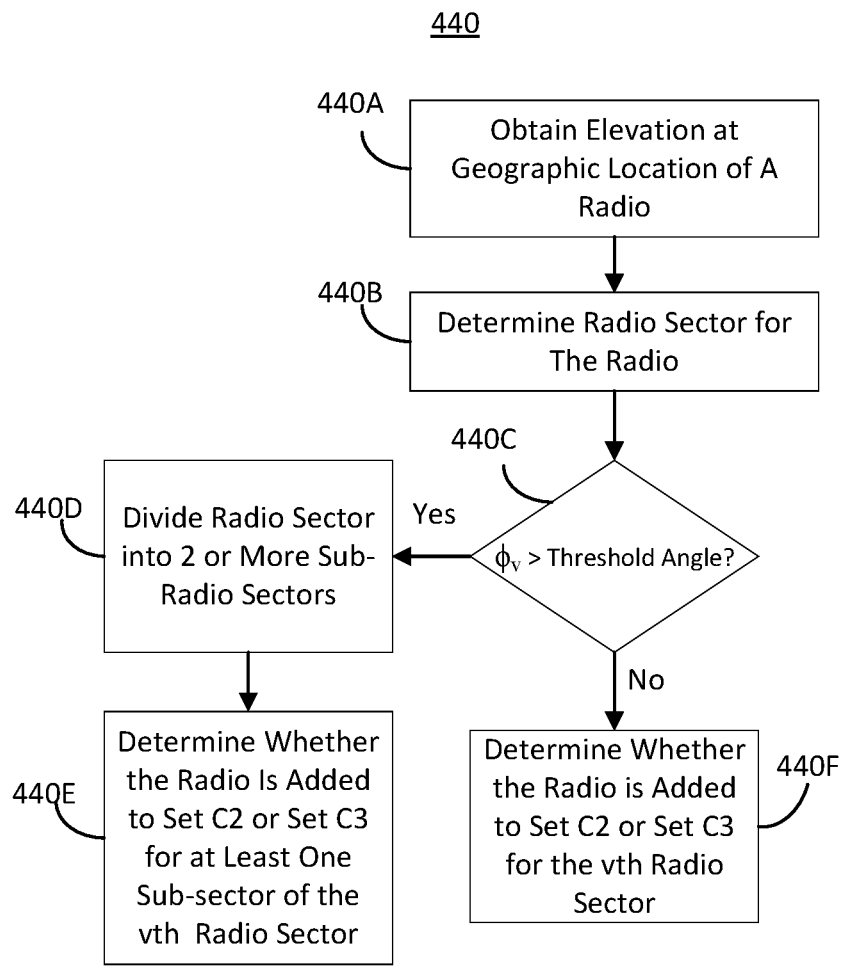
FIG. 4A illustrates a flow diagram of one embodiment of a method to determine whether a radio, within a neighborhood of a protection point of a PPA, is a member of a second set and/or a member of a third set.

FIG. 4A illustrates a flow diagram of one embodiment of a method 440 to determine whether a radio, within a neighborhood of a protection point of a PPA, is a member of the set C2 and/or a member of set C3. Thus, method 440 is performed for each radio within a neighborhood of a protection point of the PPA; if there are L radios within a neighborhood of a protection point of the PPA (where L is an integer), then method 440 is performed for each of the L radios.

A radio is determined to exceed a threshold height correction is considered to exceed the threshold height correction for all protection points of the PPA. Further, radio(s) are identified that do not require ridge correction, and thus do not require corresponding terrain elevation for ridge correction. Thus, this method 440 is performed to seek to diminish a number of pairs of protection points and radios which need to be analyzed for effective height correction, diminish a number of requests for terrain elevation for different geographic locations, and thus improve computational efficiency.

In block 440A, terrain elevation, at a geographic location of a radio in a neighborhood of a protection point of the PPA, is obtained. In block 440B, a radio sector is determined.

Figure 4B:
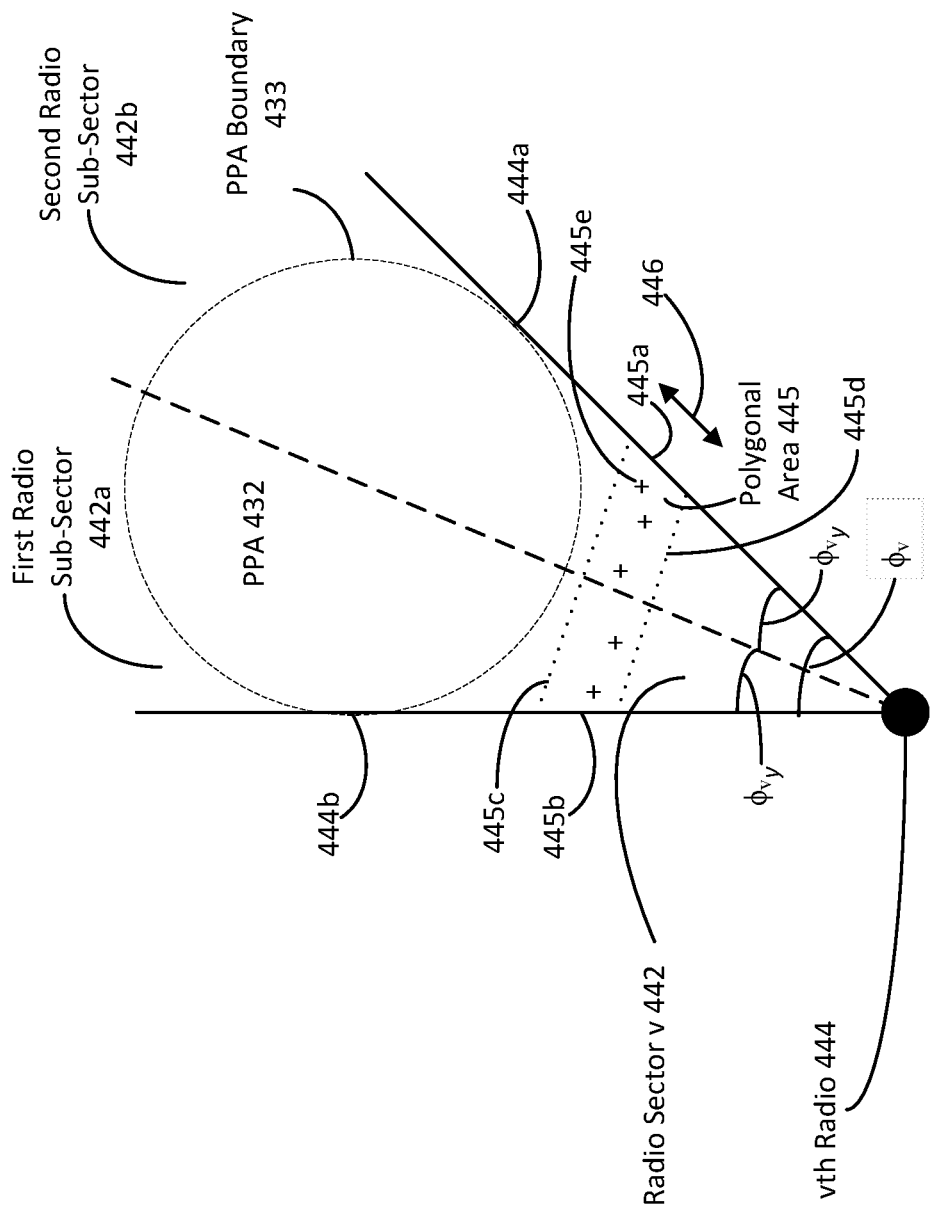
FIG. 4B illustrates a diagram of one embodiment of a radio sector v for a radio within a neighborhood of a protection point of the PPA.

FIG. 4B illustrates a diagram of one embodiment of a radio sector v 442 for a radio within a neighborhood of a protection point of the PPA 432. Radio sector means a second geographic region formed by a first radius 444a and a second radius 444b emanating from a geographic location of the radio, e.g., the illustrated with radio 444, wherein each of the two radii 444a, 444b are tangent with different points on the PPA boundary 433 and the second region encompasses all of the PPA 432. Each radio sector has an arc measure (i.e., an angle), $\phi_v$, where v is an indicium corresponding to the radio that is geographically located within a neighborhood of a protection point of the PPA 432.

Returning to FIG. 4A, in optional block 440C, whether $\phi_v$ is greater than a threshold angle is determined. Optionally, the threshold angle may vary based upon morphology type of the geographic region of a PPA (described elsewhere herein); the threshold angle may be smaller for an urban region than for a suburban region.

If $\phi_v$ is greater than the threshold angle, then, in optional block 440D, divide the radio sector into two or more radio sub-sectors, wherein each yth radio sub-sector has an angle $\phi_{v_y}$ equal to or less than the threshold angle. The number of radio sub-sectors may be determined different way. Optionally, the number of radio sub-sectors may be determined by dividing $\phi_v$ by the threshold angle, and rounding up to the next highest integer, e.g., where rounding may be performed only if the resulting quotient is a non-integer number. FIG. 4B illustrates the radio sector v 442 comprising a first radio sub-sector 442a and a second radio sub-sector 442b

Returning to FIG. 4A, then, in optional block 440E, whether the vth radio 444 is added to a subset of the set C2, e.g., to the set C2, and/or a subset of the set C3, e.g., to set C3, is determined for at least one of the sub-sectors of the vth radio sector (or radio sector v) 442. If the vth radio 444 is determined to be added to a subset of the set C2 for an yth sub-sector of a radio sector, any subsequent (or remaining) sub-sectors of the vth radio sector need not be analyzed. Thus, for example, if y=3, and the first through third sub-sectors of a vth radio sector have been analyzed, then any y sub-sectors, where y>3, need not be analyzed. If the vth radio 444 is determined to be added to a subset of the set C3 for a yth sub-sector of the vth radio sector, any subsequent (or remaining) sub-sectors of the vth radio sector need not be analyzed. Thus, for example, if y=3, and the first through third sub-sectors of a vth radio sector have been analyzed, then any y sub-sectors, where y>3, need not be analyzed. However, alternatively, although computationally inefficient, all sub-sectors of the vth radio sector may be analyzed. If $\phi_v$ is not greater than the threshold angle or if $\phi_v$ is not analyzed to determine if $\phi_v$ is greater than the threshold angle, then, in block 440F, whether the vth radio 444 is added to the set C2, and/or to a subset of the set C3, e.g., to set C3, is further determined for the vth sector 442.

Figure 4C:
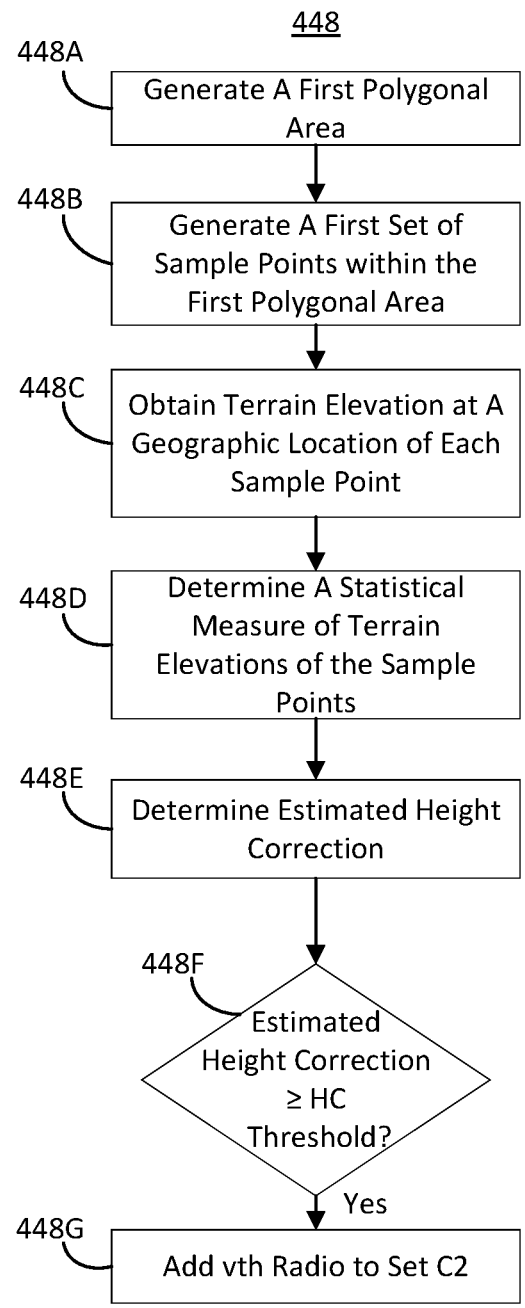
FIG. 4C illustrates a flow diagram of one embodiment of a method to determine whether a vth radio is added to the second set.

FIG. 4C illustrates a flow diagram of one embodiment of a method 448 to determine whether the vth radio 444 is added to the set C2. Method 448 is used to implement each of block 440E and block 440F with respect to the set C2. With respect to optional block 440E, method 448 is used to implement determining whether the vth radio 444 is added to a subset of the set C2 for each sector, or sub-sector thereof, that is analyzed as described elsewhere herein. Method 448 is performed for each sector not segmented into sub-sectors and for at least one sub-sector of each sector segmented into sub-sectors.

In block 448A, a first polygonal area, between the vth radio and the geographic region, is generated. FIG. 4B illustrates an exemplary polygonal area 445. A first side 445a and a second side 445b (opposing the first side 445a) of the polygonal area are respectively portions of the first radius 444a and the second radius 444b. The first side 445a and the second side 445b have a length defined by a second band of distances 446. The second band of distances 446 means a range of distances (i.e., a first distance to a second distance) along each of the first radius 444a and the second radius 444b. Optionally, the second band of distances 446 is from 3 km to 15 km, and thus 12 km in length; however, this range can vary. The remaining two sides (a third side 445c and a fourth side 445d) are opposite one another. A portion (e.g., the end points of the third side 445c) or all of the third side 445c is about a second distance from the vth radio. A portion (e.g., the end points of the third side 445c) or all of the fourth side 445d is about a first distance from the vth radio. Thus, optionally, as illustrated in FIG. 4B, the third side 445c may be a straight line and have its end points located on the first radius 444a and the second radius at the second distance from the vth radio. Further, optionally, as illustrated in FIG. 4B, the fourth side 445d may be a straight line and have its end points located on the first radius 444a and the second radius at the first distance from the vth radio. The foregoing illustrates one technique for generating the first polygonal area; however, other techniques may be used.

Returning to FIG. 4C, in block 448B, a first set of sample points within the first polygonal area 445 are generated. Optionally, the first set of sample points are uniformly and randomly distributed in the first polygonal area 445. Optionally, the first set of sample points may be formed by generating a set, e.g., a grid, of points in the first polygonal area 445, where each point is separated from adjacent point(s) by a minimum distance of resolution. Optionally, the minimum distance of resolution may be a distance within a range of 50 m to 100 m. The actual distance between the points may be randomly determined to a distance that is equal to or greater than the minimum distance. Optionally, a maximum distance of resolution between adjacent points may be established, or may be defined by dimensions of the first polygonal area; the maximum distance of resolution is greater than the minimum distance of resolution. FIG. 4B illustrates exemplary the first set of sample points 445e.

Returning to FIG. 4C, in block 448C, a terrain elevation is obtained for a geographic location of each sample point of the first set of sample points. Optionally, the terrain elevation is obtained from database(s) 109 as discussed elsewhere herein.

In block 448D, a statistical measure, of terrain elevations of the sample points (of the first set of sample points), is determined. The statistical measure of terrain elevations of the first set of sample points (or statistical measure of terrain elevation) means a mean of the terrain elevations of the sample points of the first set of sample points, median of the terrain elevations of the sample points of the first set of sample points, or a value at a threshold percentile for the distribution of the terrain elevations of the sample points of the first set of sample points (where the threshold percentile corresponds to a specific percentage of terrain elevations of the sample points of the first set sample points below the threshold percentile). The statistical measure of terrain elevation is determined for each radio (in a neighborhood of a protection point) with respect to all protection points of the PPA rather than determining an average terrain height for each pair of each radio (in a neighborhood of a protection point) and individual protection points of the PPA. As a result, computational efficiency is enhanced.

In block 448E, estimated height correction for the vth radio is determined. Estimated height correction means antenna height of the vth radio plus terrain elevation of the vth radio less the determined statistical measure of terrain elevation. In block 448F, whether the estimated height correction for the vth radio is greater than or equal to a height correction (HC) threshold is determined. Optionally, the height threshold equals a fixed value, e.g., 150 m, or may vary based upon terrain morphology type (lower for a geographic region, e.g., a PPA and optionally also neighborhood(s) around protection point(s) of the PPA, with a suburban morphology type than for an urban morphology type). If the estimated height correction for the vth radio is greater than or equal to a height threshold, then in block 448G, the vth radio is added to the set C2. If the estimate height correction for the vth radio is not greater than or equal to the height threshold then the vth radio is not added to the set C2.

Figure 4D:
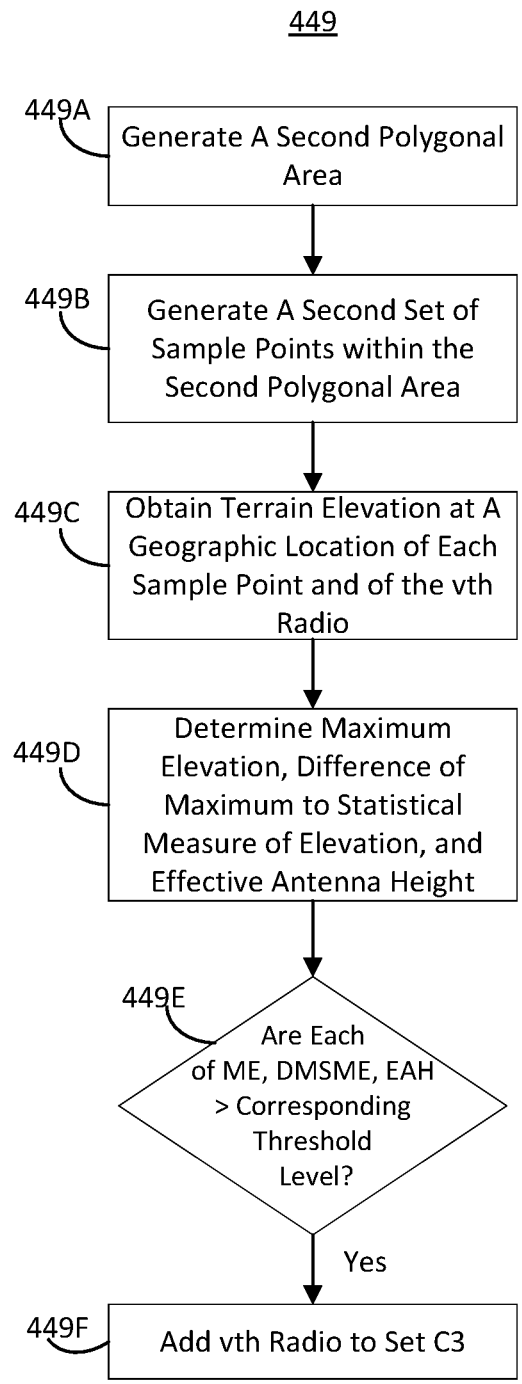
FIG. 4D illustrates a flow diagram of one embodiment of a method to determine whether a vth radio is added to the third set.

FIG. 4D illustrates a flow diagram of one embodiment of a method 449 to determine whether the vth radio 444 is added to the set C3. Method 449 is used to implement each of block 440E and block 440F with respect to set C3. With respect to optional block 440E, method 449 is used to implement determining whether the vth radio 444 is added to a subset of the set C3 for each sector, or sub-sector thereof, that is analyzed as described elsewhere herein.

In block 449A, a second polygonal area is generated. The second polygonal area may be constructed in a similar fashion as the first polygonal area described herein; however other techniques may be used. The first and second polygonal areas may be identical or may be different. For the second polygonal area, the first side 445a and the second side 445b have a length defined by a third band of distances which may or may not be the same as the second band of distances 446. The band of distances 446 means a range of distances along each of the first radius 444a and the second radius 444b. Optionally, the second band of distances 446 is from 20 km to 40 km; however, this range can vary.

In block 449B, a second set of sample points within the second polygonal area are generated. The second set of sample points may be generated as described above with respect to the first set of sample points. Optionally, the minimum distance of resolution for the second set of sample points may be different than the minimum distance of resolution for the first set of sample points. Optionally, resolution of the first or the second polygonal area is a function of the size of the area. Optionally the minimum resolution for the first or the second polygonal area is 30 m. The actual distance between the points may be randomly determined to a distance that is equal to or greater than the minimum distance.

In block 449C, a terrain elevation is obtained for a geographic location of each sample point of the second set of sample points and for the vth radio. Optionally, the terrain elevation is obtained from database(s) 109 as discussed elsewhere herein.

In block 449D, (a) a maximum terrain elevation of terrain elevations of, e.g., all, sample points of the second set of sample points (ME), (b) a difference of maximum terrain elevation and a statistical measure of terrain elevations of the second set of sample points (DMSME), and (c) an effective antenna height at the geographic location of the vth radio (EAH) are each determined. The effective antenna height at the geographic location of the vth radio means a terrain elevation at the vth radio plus the antenna height of the vth radio.

In block 449E, whether (a) the ME is greater than an ME threshold, the DMSME is greater than a DMSME threshold, and the EAH is greater than a EAH threshold is determined. Optionally, the ME threshold, the DMSME threshold, and the EAH threshold may be fixed values (e.g., respectively 412 m, 1.07, and 338 m) or may vary based upon terrain morphology type; such thresholds would be lower for a PPA located in a suburban morphology type then for a PPA located in an urban morphology type.

If (a) the ME is greater than the ME threshold, the DMSME is greater than the DMSME threshold, and the EAH is greater than the EAH threshold, then in block 449F, the radio is added to the set C3. If (a) the ME is not greater than the ME threshold, the DMSME is not greater than the DMSME threshold, and/or the EAH is not greater than the EAH threshold, then the radio is not added to the set C3.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method to determine radio maximum transmit power level, the method comprising: determining each of a first set, a second set, and a third set; wherein the first set means at zero or more subsets of at least one radio, wherein each subset of at least one radio is uniquely associated with a corresponding protection point of a geographic region which must be protected from interference from radios, and wherein each radio of a subset of at least one radio is geographically located in a neighborhood of the corresponding protection point of the geographic region and is estimated to cause interference at the corresponding protection point of the geographic region that exceeds an interference threshold level; wherein the neighborhood means a geographic region around the corresponding protection point of the geographic region; wherein the second set means a set of zero or more radios each of which is in a neighborhood of at least one protection point of the geographic region and has an effective height correction that exceeds a height correction threshold level; wherein the effective height correction of a radio means (a) terrain elevation at radio geographic location plus (b) a radio antenna height less (c) average terrain elevation along a first area of a radio sector which is formed by a first radius and a second radius emanating from a geographic location of a radio and encompasses all or a portion of the corresponding protection point, of the geographic region, in whose neighborhood the geographic location of the radio resides; wherein the third set means a set of zero or more radios each of which is in the neighborhood of at least one protection point of the geographic region, wherein there is an unobstructed line of sight between such radio and the geographic region; and for each ith protection point of the geographic region, determining a maximum transmission power level for each radio of a set $Cd_i$, wherein set $Cd_i$ means a set of radios in a neighborhood of an ith protection point of the geographic region.

Example 2 includes the method of Example 1, further comprising transmitting the determined maximum transmission power level to each corresponding radio, of a union of each set $Cd_i$, which is configured to transmit at the determined maximum transmission power level.

Example 3 includes the method of any of Examples 1-2, wherein the geographic region is a priority access license protection area or a grandfathered wireless protection zone.

Example 4 includes the method of any of Examples 1-3, further comprising: selecting a minimum maximum transmission power level for at least one radio of a union of each set $Cd_i$; wherein transmitting the determined maximum transmission power level comprises transmitting the selected minimum maximum transmission power level to a corresponding radio which is configured to transmit at the selected minimum maximum transmission power level.

Example 5 includes the method of any of Examples 1-4, wherein, for an ith protection point, determining the maximum transmission power level for each radio of the set $Cd_i$ comprises: determining a set $Cd_i$; identifying each radio that is an element of a union of the first set, the second set, and the third set and identifying each radio that is not an element of the union; for each radio that is not an element of the union, determining a path loss between a corresponding radio and the ith protection point using a modified enhanced Hata (eHata) model which does not require use of terrain elevation in a geographic zone between the radio and the ith protection point of the geographic region; for each radio which is an element of set $Cd_i$ and is an element of the union, obtaining a terrain elevation of points on a path between the radio and the ith protection point of the geographic region; for each radio which is an element of set $Cd_i$ and is an element of the union, determining a path loss, using the obtained terrain elevation, between the corresponding radio and the ith protection point using the obtained terrain elevation by determining a maximum of a first path loss determined with an eHata model and a second path loss determined with an irregular terrain model, wherein the first path loss and the second path loss are each between the corresponding radio and the ith protection point of the geographic region; and using a corresponding determined path loss, determining an aggregate interference at the ith protection point of the geographic region due to each radio that is an element of set $Cd_i$.

Example 6 includes the method of any of Examples 1-5, wherein determining the first set comprises: determining a union of sets $Cd_i$ for each protection point of the geographic region; identifying each radio that is an element of the union in each sector of the geographic region (geographic region sector), wherein geographic region sector means a first region bounded by two radii emanating from a centroid of the geographic region; for each geographic region sector in which at least one radio was identified, determining an eHata penetration radius r that is a function of a number of radios in a corresponding geographic region sector; for each geographic region sector in which at least one radio was identified, generating a circular area, with a corresponding eHata penetration radius r, is generated around a corresponding centroid of the identified radios in a corresponding geographic sector; and identifying each protection point geographically located within each generated circular area.

Example 7 includes the method of any of Examples 1-6, wherein determining whether a radio, within a neighborhood of a protection point of a geographic region, is an element of the second set or the third set comprises: obtaining a terrain elevation at a geographic location of the radio within the neighborhood of the protection point of the geographic region; determining the radio sector; and determining whether the radio is added to the second set or the third set for the radio sector or a subsector of the radio sector.

Example 8 includes the method of Example 7, wherein determining whether the radio is added to the second set for radio sector or a subsector of the radio sector comprises: generating a first polygonal area between the radio and the geographic region; generating a first set of sample points within the first polygonal area; obtaining a terrain elevation for a geographic location of each sample point of the first set of sample points; determining a statistical measure of terrain elevations of sample points of the first set of sample points, wherein the statistical measure of terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points; determining an estimated height correction for the radio; and determining that the estimated height correction is greater than or equal to a height correction threshold, then adding the radio to the second set; wherein determining whether the radio is added to the third set comprises: generating a second polygonal area between the radio and the geographic region; generating a second set of sample points within the second polygonal area; obtaining a terrain elevation for a geographic location of each sample point of the second set of sample points; determining (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio; determining whether (a) the ME is greater than an ME threshold level, the DMSME is greater than a DMSME threshold level, and the EAH is greater than a EAH threshold level; and determining that (a) the ME is greater than the ME threshold level, the DMSME is greater than the DMSME threshold level, and the EAH is greater than the EAH threshold level, then adding the radio to the third set.

Example 9 includes a non-transitory computer readable medium storing a program causing at least one processor to execute a process to determine radio maximum transmit power level, the process comprising: determining each of a first set, a second set, and a third set; wherein the first set means at zero or more subsets of at least one radio, wherein each subset of at least one radio is uniquely associated with a corresponding protection point of a geographic region which must be protected from interference from radios, and wherein each radio of a subset of at least one radio is geographically located in a neighborhood of the corresponding protection point of the geographic region and is estimated to cause interference at the corresponding protection point of the geographic region that exceeds an interference threshold level; wherein the neighborhood means a geographic region around the corresponding protection point of the geographic region; wherein the second set means a set of zero or more radios each of which is in a neighborhood of at least one protection point of the geographic region and has an effective height correction that exceeds a height correction threshold level; wherein the effective height correction of a radio means (a) terrain elevation at radio geographic location plus (b) a radio antenna height less (c) average terrain elevation along a first area of a radio sector which is formed by a first radius and a second radius emanating from a geographic location of the radio and encompasses all or a portion of the corresponding protection point, of the geographic region, in whose neighborhood the geographic location of the radio resides; wherein the third set means a set of zero or more radios each of which is in the neighborhood of at least one protection point of the geographic region, wherein there is an unobstructed line of sight between such radio and the geographic region; and for each ith protection point of the geographic region, determining a maximum transmission power level for each radio of a set $Cd_i$, wherein set $Cd_i$ means a set of radios in a neighborhood of an ith protection point of the geographic region.

Example 10 includes the non-transitory computer readable medium of Example 9, wherein the process further comprises transmitting the determined maximum transmission power level to each corresponding radio, of a union of each set $Cd_i$, which is configured to transmit at the determined maximum transmission power level.

Example 11 includes the non-transitory computer readable medium of any of Examples 9-10, wherein the geographic region is a priority access license protection area or a grandfathered wireless protection zone.

Example 12 includes the non-transitory computer readable medium of any of Examples 9-11, wherein the process further comprises: selecting a minimum maximum transmission power level for at least one radio of a union of each set $Cd_i$; wherein transmitting the determined maximum transmission power level comprises transmitting the selected minimum maximum transmission power level to a corresponding radio which is configured to transmit at the selected minimum maximum transmission power level.

Example 13 includes the non-transitory computer readable medium of any of Examples 9-12, wherein, for an ith protection point, determining the maximum transmission power level for each radio of the set $Cd_i$ comprises: determining a set $Cd_i$; identifying each radio that is an element of a union of the first set, the second set, and the third set and identifying each radio that is not an element of the union; for each radio that is not an element of the union, determining a path loss between a corresponding radio and the ith protection point using a modified enhanced Hata (eHata) model which does not require use of terrain elevation in a geographic zone between the radio and the ith protection point of the geographic region; for each radio which is an element of set $Cd_i$ and is an element of the union, obtaining a terrain elevation of points on a path between the radio and the ith protection point of the geographic region; for each radio which is an element of set $Cd_i$ and is an element of the union, determining a path loss, using the obtained terrain elevation, between the corresponding radio and the ith protection point using the obtained terrain elevation by determining a maximum of a first path loss determined with a eHata model and a second path loss determined with an irregular terrain model, wherein the first path loss and the second path loss are each between the corresponding radio and the ith protection point of the geographic region; and using a corresponding determined path loss, determining an aggregate interference at the ith protection point of the geographic region due to each radio that is an element of set $Cd_i$.

Example 14 includes the non-transitory computer readable medium of any of Examples 9-13, wherein determining the first set comprises: determining a union of sets $Cd_i$ for each protection point of the geographic region; identifying each radio that is an element of the union in each sector of the geographic region (geographic region sector), wherein geographic region sector means a first region bounded by two radii emanating from a centroid of the geographic region; for each geographic region sector in which at least one radio was identified, determining an eHata penetration radius r that is a function of a number of radios in a corresponding geographic region sector; for each geographic region sector in which at least one radio was identified, generating a circular area, with a corresponding eHata penetration radius r, is generated around a corresponding centroid of the identified radios in a corresponding geographic sector; and identifying each protection point geographically located within each generated circular area.

Example 15 includes the non-transitory computer readable medium of any of Examples 9-14, wherein determining whether a radio, within a neighborhood of a protection point of a geographic region, is an element of the second set or the third set comprises: obtaining a terrain elevation at a geographic location of the radio within the neighborhood of the protection point of the geographic region; determining the radio sector; and determining whether the radio is added to the second set or the third set for the radio sector or a subsector of the radio sector.

Example 16 includes the non-transitory computer readable medium of Example 15, wherein determining whether the radio is added to the second set comprises: generating a first polygonal area between the radio and the geographic region; generating a first set of sample points within the first polygonal area; obtaining a terrain elevation for a geographic location of each sample point of the first set of sample points; determining a statistical measure of terrain elevations of sample points of the first set of sample points, wherein the statistical measure of terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points; determining an estimated height correction for the radio; and determining that the estimated height correction is greater than or equal to a height correction threshold, then adding the radio to the second set; wherein determining whether the radio is added to the third set comprises: generating a second polygonal area between the radio and the geographic region; generating a second set of sample points within the second polygonal area; obtaining a terrain elevation for a geographic location of each sample point of the second set of sample points; determining (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio; determining whether (a) the ME is greater than an ME threshold level, the DMSME is greater than a DMSME threshold level, and the EAH is greater than a EAH threshold level; and determining that (a) the ME is greater than the ME threshold level, the DMSME is greater than the DMSME threshold level, and the EAH is greater than the EAH threshold level, then adding the radio to the third set.

Example 17 includes a system configured to determine radio maximum transmit power level, the system comprising processing circuitry configured to: determine each of a first set, a second set, and a third set; wherein the first set means at zero or more subsets of at least one radio, wherein each subset of at least one radio is uniquely associated with a corresponding protection point of a geographic region which must be protected from interference from radios, and wherein each radio of a subset of at least one radio is geographically located in a neighborhood of the corresponding protection point of the geographic region and is estimated to cause interference at the corresponding protection point of the geographic region that exceeds an interference threshold level; wherein the neighborhood means a geographic region around the corresponding protection point of the geographic region; wherein the second set means a set of zero or more radios each of which is in a neighborhood of at least one protection point of the geographic region and has an effective height correction that exceeds a height correction threshold level; wherein the effective height correction of a radio means (a) terrain elevation at radio geographic location plus (b) a radio antenna height less (c) average terrain elevation along a first area of a radio sector which is formed by a first radius and a second radius emanating from a geographic location of the radio and encompasses all or a portion of the corresponding protection point, of the geographic region, in whose neighborhood the geographic location of the radio resides; wherein the third set means a set of zero or more radios each of which is in the neighborhood of at least one protection point of the geographic region, wherein there is an unobstructed line of sight between such radio and the geographic region; and for each ith protection point of the geographic region, determine a maximum transmission power level for each radio of a set $Cd_i$, wherein set $Cd_i$ means a set of radios in a neighborhood of an ith protection point of the geographic region.

Example 18 includes the system of Example 17, wherein the processing circuitry is further configured to transmit the determined maximum transmission power level to each corresponding radio, of a union of each set $Cd_i$, which is configured to transmit at the determined maximum transmission power level.

Example 19 includes the system of any of Examples 17-18, wherein the geographic region is a priority access license protection area or a grandfathered wireless protection zone.

Example 20 includes the system of any of Examples 17-19, wherein the processing circuitry is further configured to: select a minimum maximum transmission power level for at least one radio of a union of each set $Cd_i$; wherein transmit the determined maximum transmission power level comprises transmit the selected minimum maximum transmission power level to a corresponding radio which is configured to transmit at the selected minimum maximum transmission power level.

Example 21 includes the system of any of Examples 17-20, wherein, for an ith protection point, determine the maximum transmission power level for each radio of the set $Cd_i$ comprises: determine a set $Cd_i$; identify each radio that is an element of a union of the first set, the second set, and the third set and identify each radio that is not an element of the union; for each radio that is not an element of the union, determine a path loss between a corresponding radio and the ith protection point using a modified enhanced Hata (eHata) model which does not require use of terrain elevation in a geographic zone between the radio and the ith protection point of the geographic region; for each radio which is an element of set $Cd_i$ and is an element of the union, obtain a terrain elevation of points on a path between the radio and the ith protection point of the geographic region; for each radio which is an element of set $Cd_i$ and is an element of the union, determine a path loss, using the obtained terrain elevation, between the corresponding radio and the ith protection point using the obtained terrain elevation by determining a maximum of a first path loss determined with a eHata model and a second path loss determined with an irregular terrain model, wherein the first path loss and the second path loss are each between the corresponding radio and the ith protection point of the geographic region; and using a corresponding determined path loss, determine an aggregate interference at the ith protection point of the geographic region due to each radio that is an element of set $Cd_i$.

Example 22 includes the system of any of Examples 17-21, wherein determine the first set comprises: determine a union of sets $Cd_i$ for each protection point of the geographic region; identify each radio that is an element of the union in each sector of the geographic region (geographic region sector), wherein geographic region sector means a first region bounded by two radii emanating from a centroid of the geographic region; for each geographic region sector in which at least one radio was identified, determine an eHata penetration radius r that is a function of a number of radios in a corresponding geographic region sector; for each geographic region sector in which at least one radio was identified, generate a circular area, with a corresponding eHata penetration radius r, is generated around a corresponding centroid of the identified radios in a corresponding geographic sector; and identify each protection point geographically located within each generated circular area.

Example 23 includes the system of any of Examples 17-22, wherein determine whether a radio, within a neighborhood of a protection point of a geographic region, is an element of the second set or the third set comprises: obtain a terrain elevation at a geographic location of the radio within the neighborhood of the protection point of the geographic region; determining the radio sector; and determining whether the radio is added to the second set or the third set for the radio sector or a subsector of the radio sector.

Example 24 includes the system of Example 23, wherein determine whether the radio is added to the second set comprises: generate a first polygonal area between the radio and the geographic region; generating a first set of sample points within the first polygonal area; obtain a terrain elevation for a geographic location of each sample point of the first set of sample points; determine a statistical measure of terrain elevations of sample points of the first set of sample points, wherein the statistical measure of terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points; determine an estimated height correction for the radio; and determine that the estimated height correction is greater than or equal to a height correction threshold, then adding the radio to the second set; wherein determining whether the radio is added to the third set comprises: generate a second polygonal area between the radio and the geographic region; generate a second set of sample points within the second polygonal area; obtain a terrain elevation for a geographic location of each sample point of the second set of sample points; determine (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio; determine whether (a) the ME is greater than an ME threshold level, the DMSME is greater than a DMSME threshold level, and the EAH is greater than a EAH threshold level; and determine that (a) the ME is greater than the ME threshold level, the DMSME is greater than the DMSME threshold level, and the EAH is greater than the EAH threshold level, then adding the radio to the third set.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method to determine radio maximum transmit power level, the method comprising:
   determining each of a first set, a second set, and a third set;
   wherein the first set means zero or more subsets of at least one radio, wherein each subset of the at least one radio is uniquely associated with a corresponding protection point which is a point of a geographic region and which is configured to have an aggregate interference level from radios, in a neighborhood around the point, that is less than or equal to an interference threshold level, and wherein each radio of a subset of the at least one radio is geographically located in the neighborhood of the corresponding protection point of the geographic region and is estimated to cause interference at the corresponding protection point of the geographic region to exceed the interference threshold level;
   wherein the neighborhood means a geographical region around the corresponding protection point;
   wherein the second set means a set of zero or more radios each of which is in a neighborhood of at least one protection point of the geographic region and has a radio effective height correction that exceeds a height correction threshold level;
   wherein the radio effective height correction means (a) a terrain elevation at radio geographic location plus (b) a radio antenna height less (c) an average terrain elevation along a first area of a radio sector which is formed by a first radius and a second radius emanating from a geographic location of a radio and encompasses all or a portion of the corresponding protection point, of the geographic region, in whose neighborhood the geographic location of the radio resides;
   wherein the third set means another set of zero or more radios each of which is in the neighborhood of the at least one protection point of the geographic region, wherein there is an unobstructed line of sight between such radio and the geographic region; and
   for each ith protection point of the geographic region, determining a maximum transmission power level for each radio of a set, $Cd_i$, of radios in a neighborhood of an ith protection point of the geographic region.

2. The method of claim 1, further comprising transmitting the determined maximum transmission power level to each corresponding radio, of a union of each set $Cd_i$, which is configured to transmit at the determined maximum transmission power level.

3. The method of claim 1, wherein the geographic region is a priority access license protection area or a grandfathered wireless protection zone.

4. The method of claim 1, further comprising:
   selecting a minimum maximum transmission power level for at least one radio of a union of each set $Cd_i$;
   wherein transmitting the determined maximum transmission power level comprises transmitting the selected minimum maximum transmission power level to a corresponding radio which is configured to transmit at the selected minimum maximum transmission power level.

5. The method of claim 1, wherein, for each ith protection point, determining the maximum transmission power level for each radio of the set $Cd_i$ comprises:
  determining a set $Cd_i$;
  identifying each radio that is an element of a union of the first set, the second set, and the third set and identifying each radio that is not the element of the union;
  for each radio that is not the element of the union, determining a path loss between a corresponding radio and the ith protection point using a modified enhanced Hata (eHata) model which does not require use of a terrain elevation in a geographic zone between the radio and the ith protection point of the geographic region;
  for each radio which is an element of set $Cd_i$ and is the element of the union, obtaining a terrain elevation of points on a path between the radio and the ith protection point of the geographic region;
  for each radio which is the element of set $Cd_i$ and is the element of the union, determining the path loss, using the obtained terrain elevation, between the corresponding radio and the ith protection point using the obtained terrain elevation by determining a maximum of a first path loss determined with an eHata model and a second path loss determined with an irregular terrain model, wherein the first path loss and the second path loss are each between the corresponding radio and the ith protection point of the geographic region; and
  using a corresponding determined path loss, determining an aggregate interference at the ith protection point of the geographic region due to each radio that is the element of set $Cd_i$.

6. The method of claim 1, wherein determining the first set comprises:
  determining a union of sets $Cd_i$ for each protection point of the geographic region;
  identifying each radio that is an element of the union in each sector of the geographic region (geographic region sector), wherein geographic region sector means a first region bounded by two radii emanating from a centroid of the geographic region;
  for each geographic region sector in which at least one radio was identified, determining an eHata penetration radius r that is a function of a number of radios in a corresponding geographic region sector;
  for each geographic region sector in which the at least one radio was identified, generating a circular area, with a corresponding eHata penetration radius r, is generated around a corresponding centroid of the identified radios in the corresponding geographic sector; and
  identifying each protection point geographically located within each generated circular area.

7. The method of claim 1, wherein determining whether a radio, within the neighborhood of a protection point of a geographic region, is an element of the second set or the third set comprises:
  obtaining a terrain elevation at the geographic location of the radio within the neighborhood of the protection point of the geographic region;
  determining the radio sector; and
  determining whether the radio is added to the second set or the third set for the radio sector or a subsector of the radio sector.

8. The method of claim 7, wherein determining whether the radio is added to the second set for the radio sector or the subsector of the radio sector comprises:
  generating a first polygonal area between the radio and the geographic region;
  generating a first set of sample points within the first polygonal area;
  obtaining a terrain elevation for a geographic location of each sample point of the first set of sample points;
  determining a statistical measure of terrain elevations of sample points of the first set of sample points, wherein the statistical measure of the terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points;
  determining an estimated height correction for the radio; and
  determining that the estimated height correction is greater than or equal to a height correction threshold, then adding the radio to the second set;
  wherein determining whether the radio is added to the third set comprises:
  generating a second polygonal area between the radio and the geographic region;
  generating a second set of sample points within the second polygonal area;
  obtaining a terrain elevation for a geographic location of each sample point of the second set of sample points;
  determining (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio;
  determining whether (a) the ME is greater than an ME threshold level, the DMSME is greater than a DMSME threshold level, and the EAH is greater than a EAH threshold level; and
  determining that (a) the ME is greater than the ME threshold level, the DMSME is greater than the DMSME threshold level, and the EAH is greater than the EAH threshold level, then adding the radio to the third set.

9. A non-transitory computer readable medium storing a program causing at least one processor to execute a process to determine radio maximum transmit power level, the process comprising:
  determining each of a first set, a second set, and a third set;
  wherein the first set means zero or more subsets of at least one radio, wherein each subset of the at least one radio is uniquely associated with a corresponding protection point which is a point of a geographic region which is configured to have an aggregate interference level from radios, in a neighborhood around the point, that is less than or equal to an interference threshold level, and wherein each radio of a subset of at least one radio is geographically located in the neighborhood of the corresponding protection point of the geographic region and is estimated to cause interference at the corresponding protection point of the geographic region to exceed the interference threshold level;

wherein the neighborhood means a geographical region around the corresponding protection point;

wherein the second set means a set of zero or more radios each of which is in a neighborhood of at least one protection point of the geographic region and has a radio effective height correction that exceeds a height correction threshold level;

wherein the radio effective height correction of a radio means (a) a terrain elevation at radio geographic location plus (b) a radio antenna height less (c) an average terrain elevation along a first area of a radio sector which is formed by a first radius and a second radius emanating from a geographic location of the radio and encompasses all or a portion of the corresponding protection point, of the geographic region, in whose neighborhood the geographic location of the radio resides;

wherein the third set means another set of zero or more radios each of which is in the neighborhood of the at least one protection point of the geographic region, wherein there is an unobstructed line of sight between such radio and the geographic region; and for each ith protection point of the geographic region, determining a maximum transmission power level for each radio of a set, $Cd_i$, of radios in a neighborhood of an ith protection point of the geographic region.

10. The non-transitory computer readable medium of claim 9, wherein the process further comprises transmitting the determined maximum transmission power level to each corresponding radio, of a union of each set $Cd_i$, which is configured to transmit at the determined maximum transmission power level.

11. The non-transitory computer readable medium of claim 9, wherein the geographic region is a priority access license protection area or a grandfathered wireless protection zone.

12. The non-transitory computer readable medium of claim 9, wherein the process further comprises:
selecting a minimum maximum transmission power level for at least one radio of a union of each set $Cd_i$,
wherein transmitting the determined maximum transmission power level comprises transmitting the selected minimum maximum transmission power level to a corresponding radio which is configured to transmit at the selected minimum maximum transmission power level.

13. The non-transitory computer readable medium of claim 9, wherein, for each ith protection point, determining the maximum transmission power level for each radio of the set $Cd_i$ comprises:
determining a set $Cd_i$;
identifying each radio that is an element of a union of the first set, the second set, and the third set and identifying each radio that is not the element of the union;
for each radio that is not the element of the union, determining a path loss between a corresponding radio and the ith protection point using a modified enhanced Hata (eHata) model which does not require use of terrain elevation in a geographic zone between the radio and the ith protection point of the geographic region;
for each radio which is an element of set $Cd_i$ and is the element of the union, obtaining a terrain elevation of points on a path between the radio and the ith protection point of the geographic region;
for each radio which is the element of set $Cd_i$ and is the element of the union, determining the path loss, using the obtained terrain elevation, between the corresponding radio and the ith protection point using the obtained terrain elevation by determining a maximum of a first path loss determined with a eHata model and a second path loss determined with an irregular terrain model, wherein the first path loss and the second path loss are each between the corresponding radio and the ith protection point of the geographic region; and
using a corresponding determined path loss, determining an aggregate interference at the ith protection point of the geographic region due to each radio that is the element of set $Cd_i$.

14. The non-transitory computer readable medium of claim 9, wherein determining the first set comprises:
determining a union of sets $Cd_i$ for each protection point of the geographic region;
identifying each radio that is an element of the union in each sector of the geographic region (geographic region sector), wherein geographic region sector means a first region bounded by two radii emanating from a centroid of the geographic region;
for each geographic region sector in which at least one radio was identified, determining an eHata penetration radius r that is a function of a number of radios in a corresponding geographic region sector;
for each geographic region sector in which at least one radio was identified, generating a circular area, with a corresponding eHata penetration radius r, is generated around a corresponding centroid of the identified radios in the corresponding geographic sector; and
identifying each protection point geographically located within each generated circular area.

15. The non-transitory computer readable medium of claim 9, wherein determining whether a radio, within the neighborhood of a protection point of a geographic region, is an element of the second set or the third set comprises:
obtaining a terrain elevation at the geographic location of the radio within the neighborhood of the protection point of the geographic region;
determining the radio sector; and
determining whether the radio is added to the second set or the third set for the radio sector or a subsector of the radio sector.

16. The non-transitory computer readable medium of claim 15, wherein determining whether the radio is added to the second set for the radio sector or the subsector of the radio sector comprises:
generating a first polygonal area between the radio and the geographic region;
generating a first set of sample points within the first polygonal area;
obtaining a terrain elevation for a geographic location of each sample point of the first set of sample points;
determining a statistical measure of terrain elevations of sample points of the first set of sample points, wherein the statistical measure of terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points;
determining an estimated height correction for the radio; and determining that the estimated height correction is greater than or equal to a height correction threshold, then adding the radio to the second set;

wherein determining whether the radio is added to the third set comprises:
  generating a second polygonal area between the radio and the geographic region;
  generating a second set of sample points within the second polygonal area;
  obtaining a terrain elevation for a geographic location of each sample point of the second set of sample points;
  determining (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio;
  determining whether (a) the ME is greater than an ME threshold level, the DMSME is greater than a DMSME threshold level, and the EAH is greater than a EAH threshold level; and
  determining that (a) the ME is greater than the ME threshold level, the DMSME is greater than the DMSME threshold level, and the EAH is greater than the EAH threshold level, then adding the radio to the third set.

17. A system configured to determine radio maximum transmit power level, the system comprising processing circuitry configured to:
  determine each of a first set, a second set, and a third set;
  wherein the first set means zero or more subsets of at least one radio, wherein each subset of at least one radio is uniquely associated with a corresponding protection point which is a point of a geographic region and which is configured to have an aggregate interference level from radios, in a neighborhood around the point, that is less than or equal to an interference threshold level, and wherein each radio of a subset of the at least one radio is geographically located in the neighborhood of the corresponding protection point of the geographic region and is estimated to cause interference at the corresponding protection point of the geographic region to exceed the interference threshold level;
  wherein the neighborhood means a geographical region around the corresponding protection point;
  wherein the second set means a set of zero or more radios each of which is in a neighborhood of at least one protection point of the geographic region and has a effective height correction that exceeds a height correction threshold level;
  wherein the radio effective height correction means (a) a terrain elevation at radio geographic location plus (b) a radio antenna height less (c) an average terrain elevation along a first area of a radio sector which is formed by a first radius and a second radius emanating from a geographic location of the radio and encompasses all or a portion of the corresponding protection point, of the geographic region, in whose neighborhood the geographic location of the radio resides;
  wherein the third set means a set of zero or more radios each of which is in the neighborhood of at least one protection point of the geographic region, wherein there is an unobstructed line of sight between such radio and the geographic region; and
  for each ith protection point of the geographic region, determine a maximum transmission power level for each radio of a set, $Cd_i$, of radios in a neighborhood of an ith protection point of the geographic region.

18. The system of claim 17, wherein the processing circuitry is further configured to transmit the determined maximum transmission power level to each corresponding radio, of a union of each set $Cd_i$, which is configured to transmit at the determined maximum transmission power level.

19. The system of claim 17, wherein the geographic region is a priority access license protection area or a grandfathered wireless protection zone.

20. The system of claim 17, wherein the processing circuitry is further configured to:
  select a minimum maximum transmission power level for at least one radio of a union of each set $Cd_i$;
  wherein transmit the determined maximum transmission power level comprises transmit the selected minimum maximum transmission power level to a corresponding radio which is configured to transmit at the selected minimum maximum transmission power level.

21. The system of claim 17, wherein, for each ith protection point, determining the maximum transmission power level for each radio of the set $Cd_i$ comprises:
  determine a set $Cd_i$;
  identify each radio that is an element of a union of the first set, the second set, and the third set and identifying each radio that is not the element of the union;
  for each radio that is not the element of the union, determine a path loss between a corresponding radio and the ith protection point using a modified enhanced Hata (eHata) model which does not require use of terrain elevation in a geographic zone between the radio and the ith protection point of the geographic region;
  for each radio which is an element of set $Cd_i$ and is the element of the union, obtain a terrain elevation of points on a path between the radio and the ith protection point of the geographic region;
  for each radio which is the element of set $Cd_i$ and is the element of the union, determine the path loss, using the obtained terrain elevation, between the corresponding radio and the ith protection point using the obtained terrain elevation by determining a maximum of a first path loss determined with a eHata model and a second path loss determined with an irregular terrain model, wherein the first path loss and the second path loss are each between the corresponding radio and the ith protection point of the geographic region; and
  using a corresponding determined path loss, determine an aggregate interference at the ith protection point of the geographic region due to each radio that is the element of set $Cd_i$.

22. The system of claim 17, wherein determine the first set comprises:
  determine a union of sets $Cd_i$ for each protection point of the geographic region;
  identify each radio that is an element of the union in each sector of the geographic region (geographic region sector), wherein geographic region sector means a first region bounded by two radii emanating from a centroid of the geographic region;
  for each geographic region sector in which at least one radio was identified, determine an eHata penetration radius r that is a function of a number of radios in a corresponding geographic region sector;

for each geographic region sector in which at least one radio was identified, generate a circular area, with a corresponding eHata penetration radius r, is generated around a corresponding centroid of the identified radios in the corresponding geographic sector; and identify each protection point geographically located within each generated circular area.

23. The system of claim 17, wherein determine whether a radio, within the neighborhood of a protection point of a geographic region, is an element of the second set or the third set comprises:

obtain a terrain elevation at the geographic location of the radio within the neighborhood of the protection point of the geographic region;

determining the radio sector; and determining whether the radio is added to the second set or the third set for the radio sector or a subsector of the radio sector.

24. The system of claim 23, wherein determine whether the radio is added to the second set for the radio sector or the subsector of the radio sector comprises:

generate a first polygonal area between the radio and the geographic region;

generating a first set of sample points within the first polygonal area;

obtain a terrain elevation for a geographic location of each sample point of the first set of sample points;

determine a statistical measure of terrain elevations of sample points of the first set of sample points, wherein the statistical measure of terrain elevations of the sample points of the first set of sample points means an average of the terrain elevations of the sample points of the first set of sample points, a median of the terrain elevations of the sample points of the first set of sample points, or a value at a threshold percentile for a distribution of the terrain elevations of the sample points of the first set of sample points;

determine an estimated height correction for the radio; and determine that the estimated height correction is greater than or equal to a height correction threshold, then adding the radio to the second set;

wherein determining whether the radio is added to the third set comprises:

generate a second polygonal area between the radio and the geographic region;

generate a second set of sample points within the second polygonal area;

obtain a terrain elevation for a geographic location of each sample point of the second set of sample points;

determine (a) a maximum terrain elevation of terrain elevations of sample points of the second set of sample points (ME), (b) a difference of the maximum terrain elevation and a statistical measure of terrain elevations of sample points of the second set of sample points (DMSME), and (c) an effective antenna height at the geographic location of the radio (EAH), wherein the effective antenna height at the geographic location of the radio means a terrain elevation at the radio plus an antenna height of the radio;

determine whether (a) the ME is greater than an ME threshold level, the DMSME is greater than a DMSME threshold level, and the EAH is greater than a EAH threshold level; and determine that (a) the ME is greater than the ME threshold level, the DMSME is greater than the DMSME threshold level, and the EAH is greater than the EAH threshold level, then adding the radio to the third set.

\* \* \* \* \*